United States Patent [19]

Savage

[11] 4,128,011
[45] Dec. 5, 1978

[54] INVESTIGATION OF THE SOUNDNESS OF STRUCTURES

[76] Inventor: Robert J. Savage, Ulverley House, Woodland Way, Kingswood, Surrey, England

[21] Appl. No.: 596,120

[22] Filed: Jul. 15, 1975

[30] Foreign Application Priority Data

Jul. 16, 1974 [GB] United Kingdom ............... 31500/74
Nov. 28, 1974 [GB] United Kingdom ............... 51660/74
Dec. 12, 1974 [GB] United Kingdom ............... 53803/74

[51] Int. Cl.² ...................... G01N 29/00; G01V 1/14
[52] U.S. Cl. .................................... 73/579; 73/594; 73/632; 340/15.5 R
[58] Field of Search ............... 73/67, 67.2, 67.3, 67.4, 73/67.5 R, 67.6, 67.7, 71.5 R, 88 R, DIG. 1, 71.5 US, 574, 579, 584, 594; 340/15.5 R, 15.5 SW, 15.5 BH, 17

[56] References Cited

U.S. PATENT DOCUMENTS

| | | | |
|---|---|---|---|
| 2,549,076 | 4/1951 | Gallagher et al. | 73/67 |
| 2,607,216 | 8/1952 | Mason | 73/71.5 US |
| 2,667,068 | 1/1954 | Viehe et al. | 73/67.2 |
| 2,718,929 | 9/1955 | Wiess | 340/15.5 BH |
| 3,052,116 | 9/1962 | Critchley et al. | 73/DIG. 1 |
| 3,208,549 | 9/1965 | Alexander et al. | 340/15.5 BH |
| 3,224,253 | 12/1965 | McKay | 73/67 |
| 3,292,143 | 12/1966 | Russell | 73/67.6 |
| 3,813,934 | 6/1974 | Meyer | 73/DIG. 1 |
| 3,836,952 | 9/1974 | Johnson | 73/67.7 |
| 3,871,217 | 3/1875 | Miley | 73/67.2 |
| 3,886,493 | 5/1975 | Farr | 340/17 R |
| 3,938,072 | 2/1976 | Baird et al. | 73/67.2 |
| 3,961,307 | 6/1976 | Hochheimer | 73/67.8 S |

OTHER PUBLICATIONS

Blumberg et al., "Dynamic Analysis of Offshore Structures", pp. 1-16, 1969.

*Primary Examiner*—Richard C. Queisser
*Assistant Examiner*—Stephen A. Kreitman
*Attorney, Agent, or Firm*—Sughrue, Rothwell, Mion, Zinn and Macpeak

[57] ABSTRACT

Method and apparatus for the investigation of the soundness of structures of various kinds are disclosed. A method which involves the transmission of a vibration wave through the structure in question and the detection of the frequency spectrum of vibration response at selected locations is disclosed as finding wide application throughout civil and structural engineering investigations. Explanation is given of the adaptation of this method to the continuous monitoring of periodic investigation of structures, with particular reference to offshore oil and gas platforms, to deteriorating concrete structures and components, and to existing bridges, tunnels and railway track systems. A number of elongate gauges for extending longitudinally of selected critical members of an offshore structure below the waterline to monitor its structural integrity and performance are also described.

24 Claims, 18 Drawing Figures

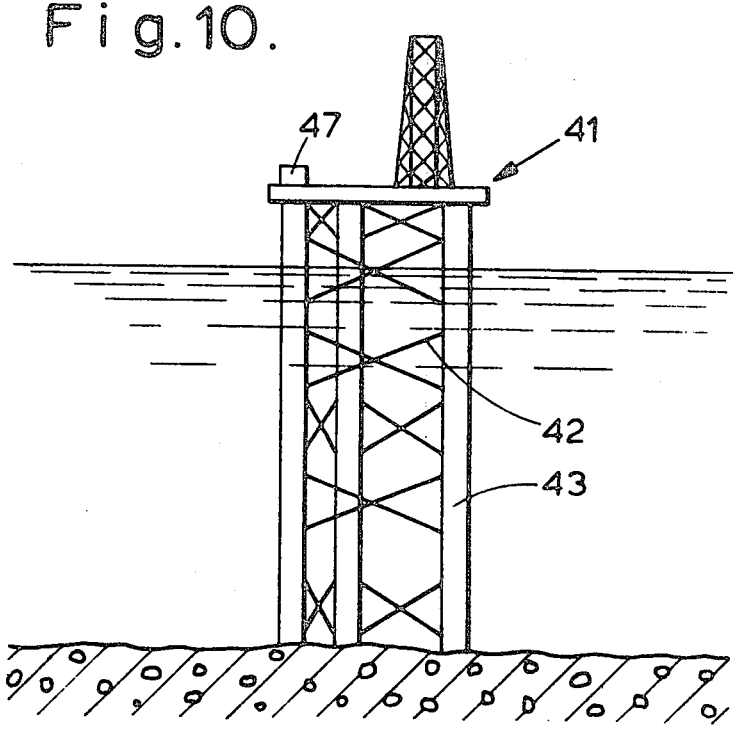
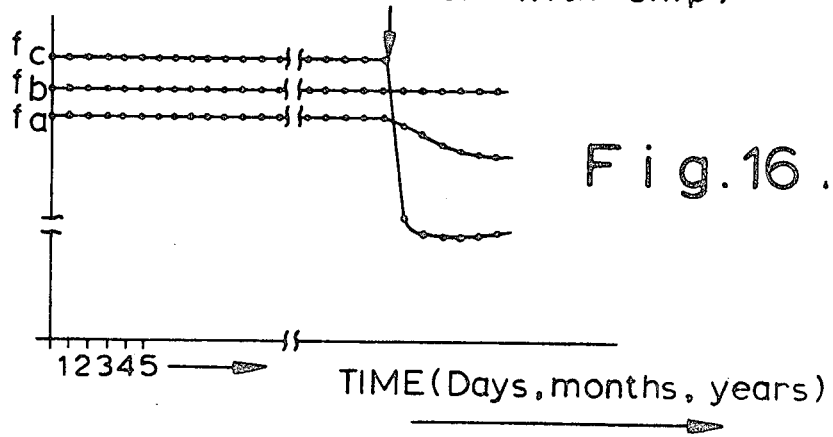

WELDED JOINT

WELD OR EPOXY GROUT

INVESTIGATION OF THE SOUNDNESS OF STRUCTURES

FIELD OF THE INVENTION

This invention relates broadly to the investigation of the soundness of structures. I provide various methods within the scope of this invention for investigating the soundness of structures of many diverse types. The invention also relates to apparatus for use in performing such methods.

As examples of methods in accordance with this invention, there are described below the exploration of the subterranean soundness of soils and rock formations from the ground surface; the investigation ahead of a tunnel face which is being driven so that a three-dimensional picture of any sizeable voids, fissures, aquifers or other anomalies existing ahead of the face can be determined; the exploration beneath the foundations of existing buildings to determine the structural integrity of the supporting soil and rock formations; and the continuous monitoring or periodic investigation of structures, such as offshore oil and gas exploration and production platforms, railway and road bridges, railway track systems, tunnel liners and the individual components of buildings, such as walls, floors, beams, columns and ceilings.

Whilst this invention has initially been developed with its incorporation into the armoury of the practising engineering geologist, geophysicist and site investigation engineer in mind, the invention is not wholly limited to these fields as I shall explain below.

BACKGROUND TO THE INVENTION

If a structure or building is erected on foundations which overlie a faulty area such as solution cavities, soft ground etc., the structural integrity of the building is at risk. It is well-known that a solution cavity for instance will gradually work its way towards the ground surface due to the instability of the cavity roof which periodically tends to spall off in discrete blocks of rock which then fall to the floor of the cavity and over a period of time one could expect a randomly oriented rock floor through which water from underground streams usually percolates (the underground stream is the principal cause of the cavity in the first place). As the cavity approaches the ground surface the cavity roof becomes so weak that in the case of an open field a "sink hole" or "swallow hole" appears on the ground surface where the ground surface actually deflects downwards into usually a bowl-shaped region. If the solution cavity exists beneath a building it will be evident that the building will ultimately suffer and become unsafe for occupancy.

In order to determine the presence of such cavities and other anomalies beneath the ground surface it has been the practice of foundation engineers to perform a site investigation. These site investigations have been traditionally performed by the simple expedient of driving boreholes from the ground surface and if solid soil and rock are encountered to some prescribed depth, it has been assumed that the building can be safely erected. Historically however, it has been proved on many occasions that boreholing by itself is not satisfactory because the boreholing method simply samples along the line of the borehole only; i.e. the volume of ground samples is insufficient. Other techniques have utilized the boreholes in order to extend the volume of ground samples beneath a given site, these methods include radiometric methods, gamma ray, neutron backscattering, resistivity methods, gravity methods, magnetometer methods etc.: all of which are described adequately in the literature. Depending upon a number of factors including site conditions, all these methods have their inherent advantages and disadvantages. For example, in one X-ray method, an X-ray source is used down a borehole to detect objects in a matrix of differing degrees of density e.g. a boulder suspended within clay. However the penetration of the X-rays into the clay is no more than a few borehole diameters and if a borehole was driven into rock and by-passed a large cavity only a matter of two or three feet away from the cavity wall, the X-ray method (and most other methods) would not detect the presence of the cavity.

It is among the objects of this invention to provide a method for investigating the soundness of structures which is applicable inter alia to site investigation and to the investigation of the soundness of existing engineering structures at the time of investigation.

A further object of this invention is to provide a trace indicating the soundness of the structure at the time in question.

To the best of my knowledge it has not previously been possible to follow the fatigue of a structure as a whole and in particular to be able to tell if, and when, the soundness or structural integrity of the whole structure passes a point from which it will catastrophically decay. Equally, to the best of my knowledge, it has not been readily possible heretofore to follow the effect of accidental damage or the effect of environmental forces on a structure and again to tell when the effect of these phenomena has passed the point of danger.

My interest in the monitoring of the soundness or structural integrity of structures over a period of time and the realization of the value of my methods in such context arose from a consideration of the problems associated with offshore structures. Such structures present peculiar difficulties; and these difficulties are compounded by historical factors.

Historically, naval architects have experience in the design of ships and other structures which float while civil engineers usually require foundations for their structures; and yet the design of an offshore structure requires a combination of these and other disciplines in order to advance as a new technology. It could be argued that there are parallels, such as harbour works, but in general, harbour works are in shallow waters, are relatively protected from the open sea environment and can gain great strength and rigidity by backing on to a land mass.

The offshore structure is exposed to the worst of the elements, wave dynamics, wind and gust loads, shear currents, high hydrostatic pressures, operating impact and vibration loads, accidental loads from tender vessels, the marine life and associated chemical environments to name a few. These tall, relatively slender structures therefore experience shear forces, bending and twisting moments; and are responding dynamically all the time. Add to this the unforeseen or included faults, such as microcracking in concrete components, the occasional lapse in workmanship during assembly, and the stress concentrations thus produced, and the structure becomes a prime candidate for corrosion fatigue failures, brittle fractures and other equally serious failures. The unique combination of the elements and unintentional but inherent faults in the structure produces a total environment which has not previously been experienced by all the disciplines needed to design, manufacture and operate an offshore structure.

In its endeavour to exploit the natural resources underneath the North Sea as rapidly as possible, the oil and natural gas extraction industry has until now had to rely in a major part on the existing technology in offshore structures; but this existing technology is associated in the main with shallow water conditions in the far more friendly environment of the Gulf of Mexico. There is very real risk (as has recently been confirmed by misadventure reported in practice in news reports and in the technical pass) in extrapolating designs produced for such conditions for operation under the much more severe conditions of the North Sea; and I envisage that designs for offshore structures constructed in accordance with this invention will find an important place where the monitoring of the day to day performance of such offshore structures is desired in more northern climes, particularly under exposed or deep water operation, so that the first signs of incipient failure can be detected at an early enough stage to permit remedial work to be performed, and also so that we can learn how such structures will operate under more severe conditions, to incorporate the lessons learned in the next generation of offshore structures. In addition, there is an evident need for the development of a technology in deep water offshore structures.

It is accordingly among the objects of this invention to provide methods of and apparatus for monitoring the soundness or structural integrity and performance of various structures over a period of time.

It is also an object of this invention to provide methods for the continuous monitoring of the soundness or structural integrity of offshore structures at all stages in the development of the technology of deep water offshore structures from tests on models, through the prototype stages, to continuous monitoring of operation structures.

SUMMARY OF THE INVENTION

According to a first aspect of my invention, I provide a method for investigating the soundness of a structure, the method comprising the steps of:
producing a vibration wave;
transmitting said wave through said structure and thereby producing a vibration response in said structure;
detecting the vibration response at one or more locations of said structure;
varying the frequency of the transmitted wave over a range; and
effectively recording the magnitude of the vibration response at said one or more locations at different frequencies of the transmitted wave to produce a spectrum of frequency response.

It will be understood that the term "structure" as used herein is to be liberally interpreted depending upon the appropriate context; the "structure" may for example, in suitable circumstances, be the ground itself, a rock face, or a building or other engineering structure. Other suitable candidate "structures" will readily suggest themselves.

In a second aspect of this invention, I provide apparatus for investigating the soundness of structures, the apparatus comprising:
means for producing a vibration with a variable frequency and for transmitting said vibration as a wave through a structure;
means for detecting vibration reponses at one or more locations; and
means for effectively producing a record of the magnitude of the vibration response at different frequencies of the transmitted wave to produce a frequency response spectrum.

In a third aspect of this invention I provide a method of monitoring the soundness or structural integrity and performance of a structure over a period of time, the method consisting of:
producing a vibration wave;
transmitting said vibration wave through the structure to produce a vibration response therein;
sampling the vibration response at one or more locations of said structure;
varying the frequency of the transmitted vibration wave over a range of interest; and
effectively producing a record of the frequencies at which maxima occur in the frequency spectrum of vibration response; and
performing all the aforesaid steps at predetermined intervals to provide a record of any variation in the frequencies at which maxima occur in the frequency spectra of vibration response at said same one or more locations during the passage of time.

As will be apparent from the subsequent description, my invention in its third aspect is particularly suitable for monitoring the integrity of offshore structures. To date I am insufficiently satisfied with the ability of the apparatus I have devised for performing my methods as aforesaid to withstand continuous immersion in water; and so I must at present regard my apparatus as suitable for location on offshore structures only above the waterline and particularly on the super-structure.

Until my aforesaid apparatus has been perfected for continuous under water operation, I provide, in a further aspect of this invention, an offshore structure provided with means for monitoring its structural integrity and performance, which means comprise:
elongate gauges extending longitudinally of selected critical members of the said structure below the water line, each said gauge having its ends solid with its respective member and including means for causing a vibration to be set up between the ends of the gauge, and means for detecting the characteristic frequency of said vibration;
means for periodically operating said gauges from a location above the water line; and
means for recording any variation of the detected characteristic frequencies of said gauges indicative of changes in the longitudinal dimensions of said members and thus of their strain states.

As will become apparent from the description given below with particular reference to the drawings accompanying this specification, a variety of quite different forms of gauges can find utility in this aspect of my invention. Their common feature is that in effect they are adapted to determine the longitudinal dimension of the gauge (i.e. the distance between its ends); since the ends of the gauges are to be solid with their respective members, this in effect gives an indication of changes in the longitudinal dimensions of the members. I envisage various ways of causing a vibration to be set up between the ends of the gauge. In a stretched wire gauge either longitudinal or transverse vibrations may be set up. For longitudinal vibrations the characteristic frequency may well be the fundamental, although I also contemplate the use in appropriate circumstances of an harmonic. For transverse vibrations in a gauge of the length I contemplate, only a fairly high harmonic frequency would be suitable and as I shall explain the gauges can be deliberately set into such harmonic mode. I also contemplate the use, for example, of a water hammer either of the closed or open end type. In effect the double passage time of a shock wave produced from a vibrator at one end of the water hammer is determined, which of course gives the frequency. Alternatively the frequency may be determined directly. Other suitable gauges will occur to those skilled in this art.

BRIEF DESCRIPTION OF THE DRAWINGS

FIG. 10 shows schematically an embodiment of offshore structure utilizing the invention;

FIG. 16 schematically illustrates how the characteristic frequencies of three gauges mounted on respective members of the structure might vary over time and with events.

DESCRIPTION OF PREFERRED EMBODIMENTS

I shall now describe a number of specific examples of the use of techniques and apparatus in accordance with this invention, for solving particular problems.

1. A Surface Method of Site Investigation

I propose two basic methods for searching for cavities and other anomalies from the surface; and for ease of description I will call these the "initial" or "coarse" method of searching and the "final" or "fine" method of searching.

The coarse method permits a rapid but crude indication of suspect areas over the site concerned. An electro-hydraulic or electro-dynamic vibrator is housed in a vehicle and positioned over an auger or rock-bolt which is attached to the rock surface. Power is applied to the vibrator via the hydraulic power pack and audio-amplifier and the local rock and soil is set into a vibratory motion. This produces compressive stress waves ($p$ waves) in the soil and rock and the frequency is increased until one or several resonances are encountered. The frequency of unsound areas is significantly different from frequencies recorded for sound areas. Hence it is necessary to calibrate the sound areas to first obtain the expected spectrum of sound responses. A calibration test in an unsound area is also required for the same reason. Therefore it is necessary when encountering a non-typical response to provide a borehole in that area in order to calibrate that particular spot. The frequency range is swept from a low to a high frequency in order to establish the local resonance phenomena. Resonance in this particular case may, I believe, be regarded as a small lenticular volume of soil and/or rock beginning to participate with the motion of the vibrator as the vibrator is swept through its frequency range (preferably form approximately 2 to as high as 600 Hz). Frequency is an extremely sensitive parameter and the amplitude of the response at specific frequencies is indicative of the soundness of the subterranean strata. For example if loose ground (which I use here to mean the blocky rock as previously described from a partially collapsed swallow hole) is found the responses will be exhibited fairly strongly at several discrete frequencies in the frequency spectrum depending upon the mass of the individual blocks excited by the surface vibration and the effective spring constants in which the blocks of rock are held. A block of rock held in a clay matrix for example will have a specific frequency of response depending upon its mass and the spring stiffness of the clay holding it in position.

Figure 1:
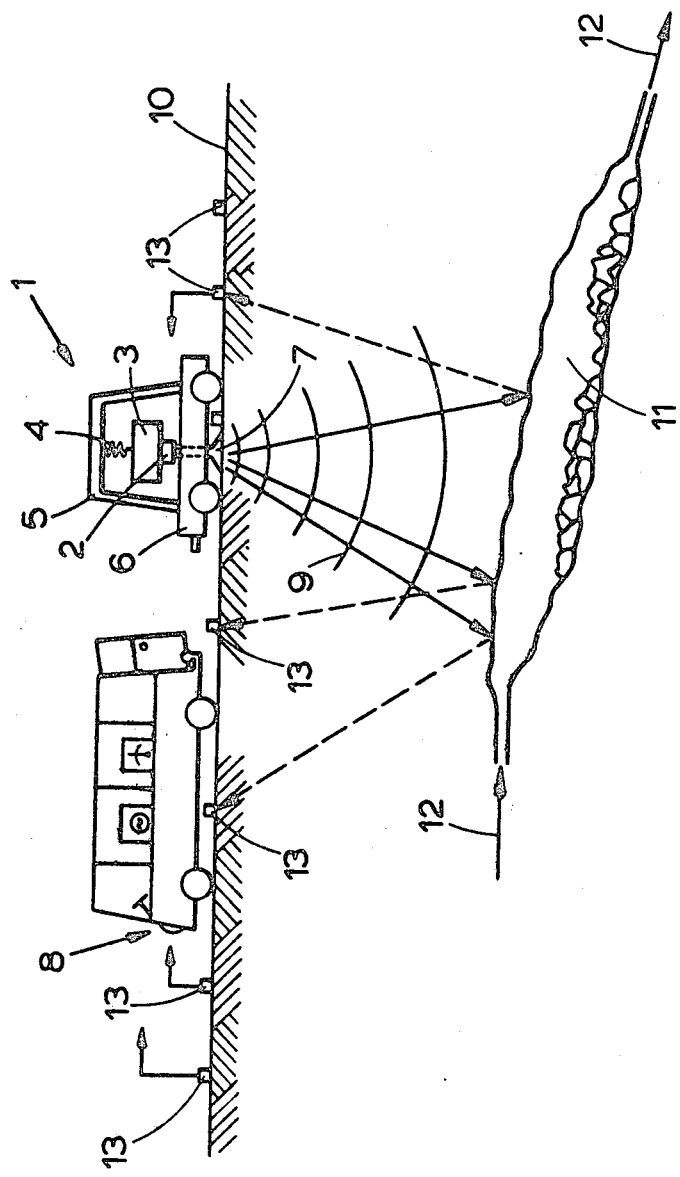
FIG. 1 is a schematic view illustrating apparatus in accordance with this invention being used to detect the presence of a typical solution cavity.
Figure 2:
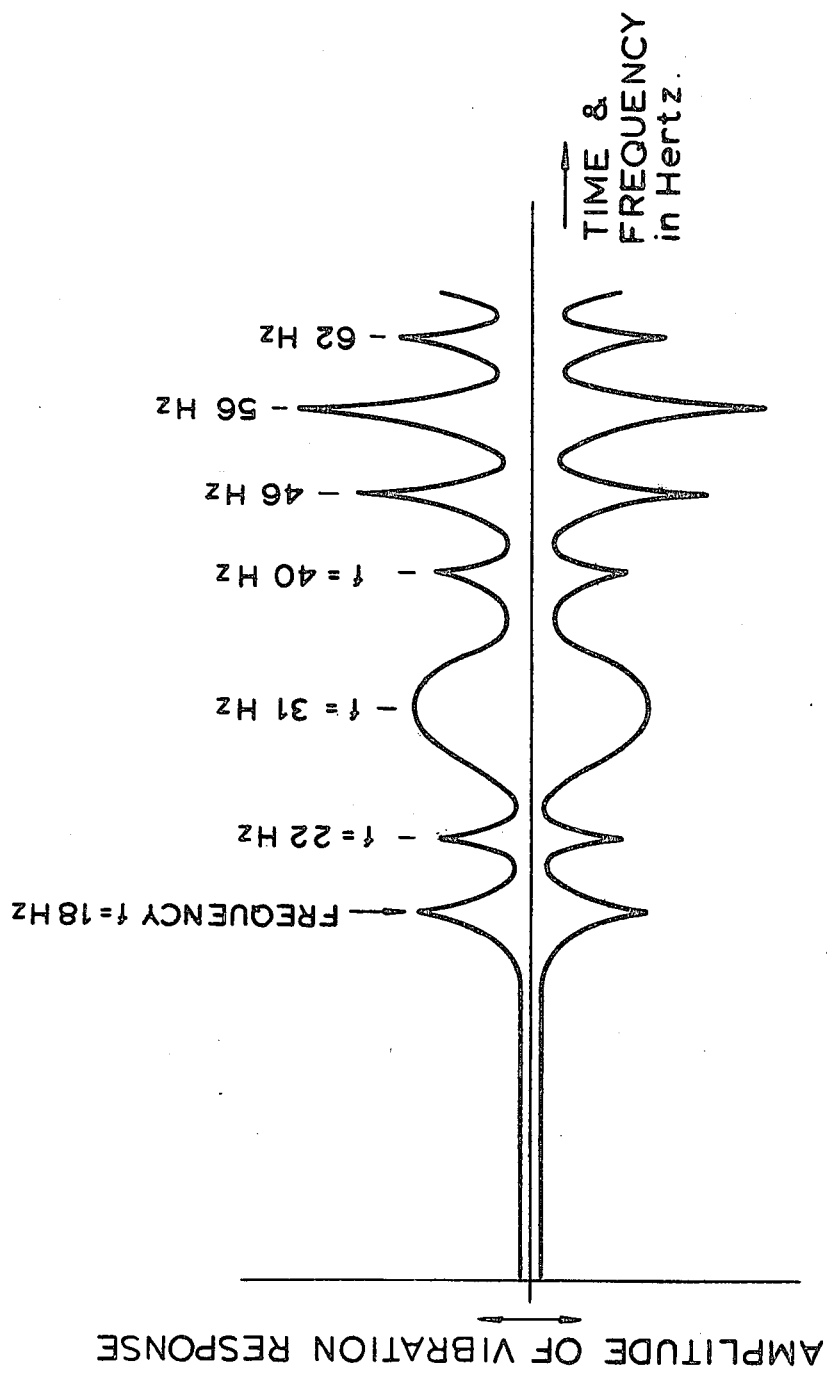
FIG. 2 shows a trace of the kind which would be produced in a typical case with the apparatus of FIG. 1.

FIG. 1 shows a schematic view of the equipment in use in a method of site investigation from the surface. FIG. 2 shows a typical response obtained for this last blocky rock example quoted and is taken from an actual trace produced by me in a recent test performed for confirmation of this theory. In the illustrated arrangement of FIG. 1, vibration apparatus 1 consists of a vibrator 2 which is coupled between a reaction mass 3, supported by a suspension spring system schematically indicated at 4 from an "A" frame 5 of a trailer 6, and a ground plate 7. The vibrator 2 is controlled from a vibration control and instrument van 8; and upon the vibrator 2 being set into vibration in a longitudinal mode, the ground plate 7 transmits a compression or p-wave 9 below the surface 10 of the ground.

FIG. 1 schematically indicates the interception of the p-wave 9 by a typical solution cavity 11 caused by an underground water flow 12,12. This causes reflected vibrations which are detected at spaced locations along the ground surface 10 by suitable positioned surface sensors 13,13; each of the surface sensors being coupled to the vibration control and instrument van 8. The graph of FIG. 2 shows only the envelope of the vibration response detected at one of the sensors 13, for clarity. The trace may be produced by a typical heat or ink recorder since the frequency of the transmitted vibration increases linearly with time. The response curve indicates resonances which I have found to be typical for loose, broken ground beneath the surface.

When a suspect area has been located by the coarse technique, it may be necessary to further define the void size, the cavity size, volume and approximate geometry by conducting a fine search. This may for example be performed by placing specially encapsulated triaxial accelerometers down boreholes lying close to the suspect area and recording the stress waves as they propagate from the surface vibrator and reflect from the rock/air interfaces of the void. A triangulation technique is then used to map the void in three dimensions thus producing the approximate volume of the void. Such information would be of value for foundation engineering purposes where it is necessary to estimate the amount of fill required to render the land usable for building purposes.

2. Investigation in tunnels

The methods fall into three distinct types of tests all of which have the same objective, that of detecting cavities, fissures, aquifers and other anomalies which may exist ahead of either a rock tunnel or a soft ground tunnel. All three types of method also use my resonance technique.

2.1 Face vibration without boreholes

This method consists of attaching either an electrohydraulic or electro-dynamic vibrator to the centre of a tunnel face by means of a rock-bolt or by means of being preloaded against the face by using other equipment such as the tunnel machine as a reaction mass. The frequency range is then swept as described in the surface method from fairly low to high frequencies, preferably in rock tunnels from 10 Hz to 2,000 Hz and in soft ground tunnels from 2 Hz to perhaps 600 or 700 Hz. At discrete frequencies it will be found that the tunnel face begins to participate with the motion of the vibrator; thus a resonance and a higher harmonics are established at these discrete frequencies. At these frequencies, minimum power is required in order to propagate compression (p) waves in the direction of the advancing tunnel. If a void, fissure or other anomaly exists ahead of the face and in a plane not coincident with the tunnel longitudinal axis, it will interfere with the passage of the p waves and reflection waves will be transmitted back to the tunnel face, depending upon the incident angle of the fault in comparison to the line of the tunnel. Accelerometers then placed on the face can detect not only the in-going compression waves but also the reflection waves and the mutual interference thus created. By using switching transients and/or increases and decreases in the vibration amplitude the double transit time from the face to the anomaly and back to the face again can be accurately measured. Hence, knowing the speed of sound in the particular material which is being excited provides the range or distance of the anomaly from the face.

2.2 Face vibration with boreholes

The detection of anomalies can be enhanced using the face vibration method as described in 2.1 but with the utilisation of triaxial accelerometers placed down boreholes to receive p wave and shear wave (s wave) signals from the face.

Figure 3:
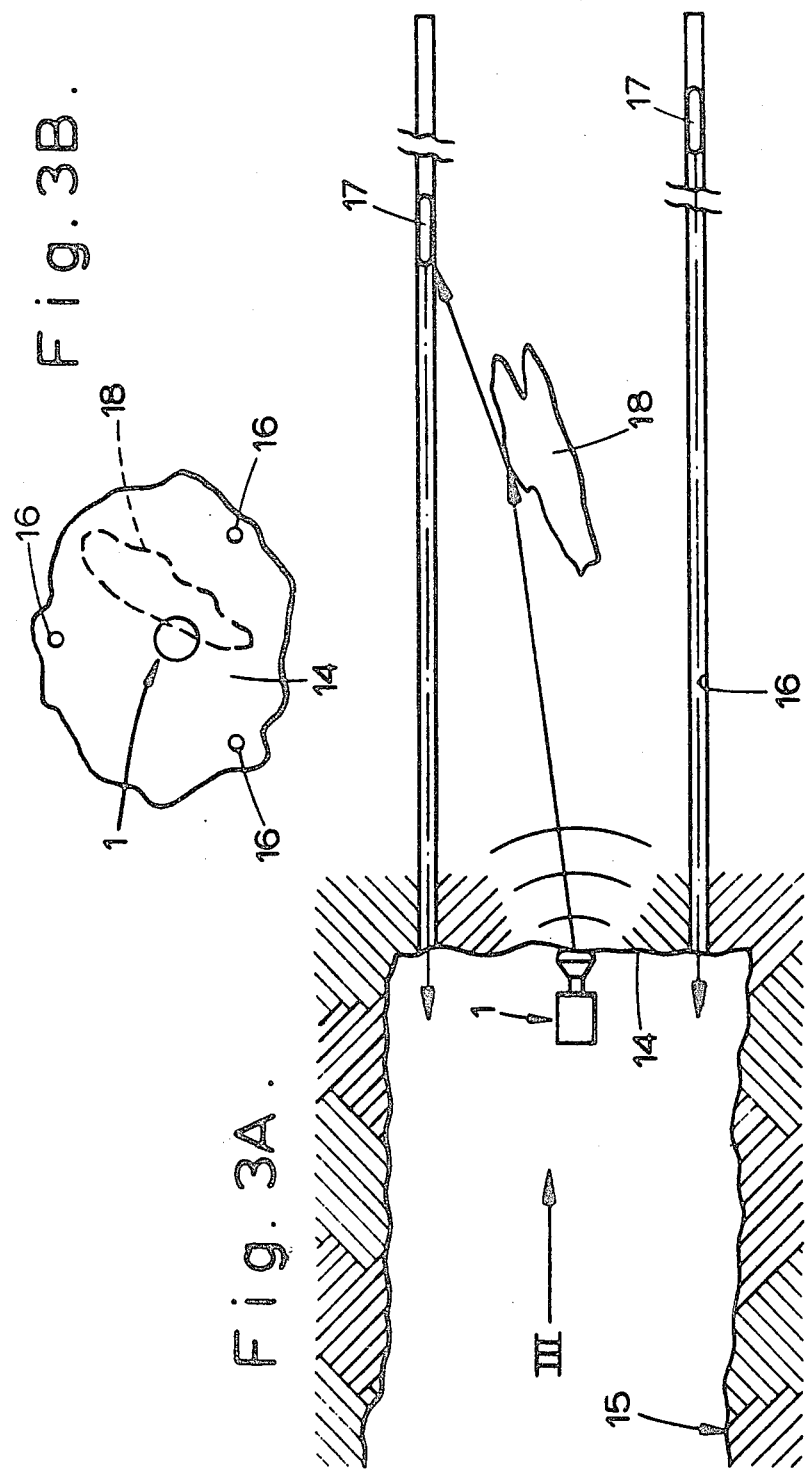
FIGS. 3A and 3B show schematically the use of methods and apparatus in accordance with this invention in the driving of tunnels, FIG. 3B showing the view down the tunnel as seen in the direction of the arrow III of FIG. 3A.

FIGS. 3A and 3B illustrate the application of this modified version of the method to the driving of tunnels in rock. The vibration apparatus 1 is fixed to or bears against the centre of existing forward face 14 of tunnel 15. Three equally spaced boreholes 16 extends forwardly from the face 14 into the ground ahead of the forward face 14. A sensor capsule 17 is located down each of the forwardly extending boreholes 16 and contains a triaxial accelerometer (i.e. three mutually orthoganally directed accelerometers capable of being oriented as a unit in desired directions). P waves are caused to propagate from the vibration unit 1 ahead of the face and will be reflected from any anomaly such as the typical void illustrated at 18 at some angle of deflection. As before, the frequency of vibration of the transmitted p wave is varied through a range of interest; and resonance peaks indicating the existence of different types and sizes of voids will appear. Once it is apparent that some anomaly exists ahead of the face 14, alteration of the position of the sensor capsules both longitudinally within the borehole and rotationally makes it possible for me to readily triangulate the position and extent of any detected anomaly and in particular to determine whether it lies within the intended route of the tunnel, or outside that route. It will of course be understood that the sensor capsules are coupled by suitable electric wiring to a recorder/analyser station.

Particularly useful in the arrangement of FIG. 3A in which the vibrator is required to be mounted on its side against a vertical face is a preferred embodiment of vibration system in which the ground plate (such as 7 — FIG. 1) is held in position, or at least assisted in remaining in position, by means of a partial vacuum. In order to achieve this, the ground plate which is some 25 inches in diameter is provided with a 4 inch thick rim. The ground plate is generally saucer shaped but has its concave side which bears against the ground divided into a number of sections by radial webs. Each of the resultant sections is provided with a through aperture which is coupled by suitable and pneumatic tubing to a vacuum pump. As a result, the interior of the saucer becomes at least partially exhausted. I have found that this arrangement is also of value in performing the basic method of FIG. 1 where the ground plate tends otherwise to bounce. The use of a partial vacuum ensures a good coupling with the ground and avoids unnecessary attenuation occurring at the ground plate/ground interface.

2.3 Borehole Vibration

Figure 4:
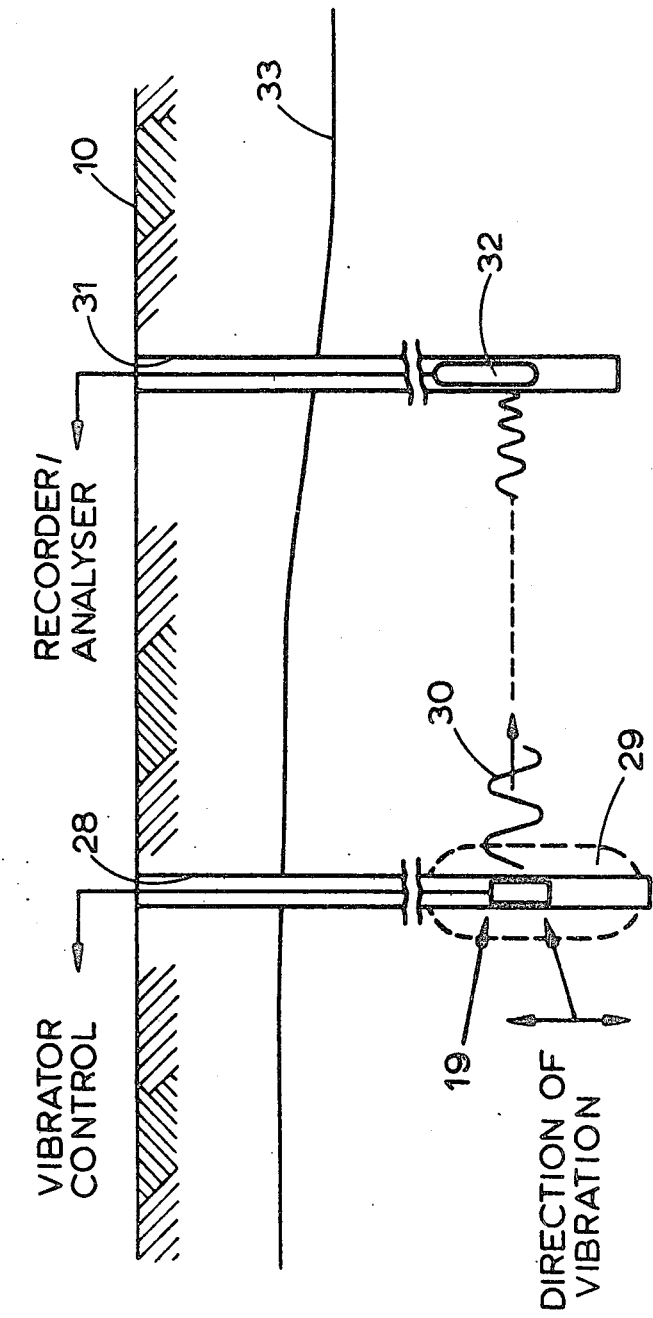
FIG. 4 shows the use of apparatus in accordance with this invention in investigation of sub-soil or rock from bore holes.
Figure 5:
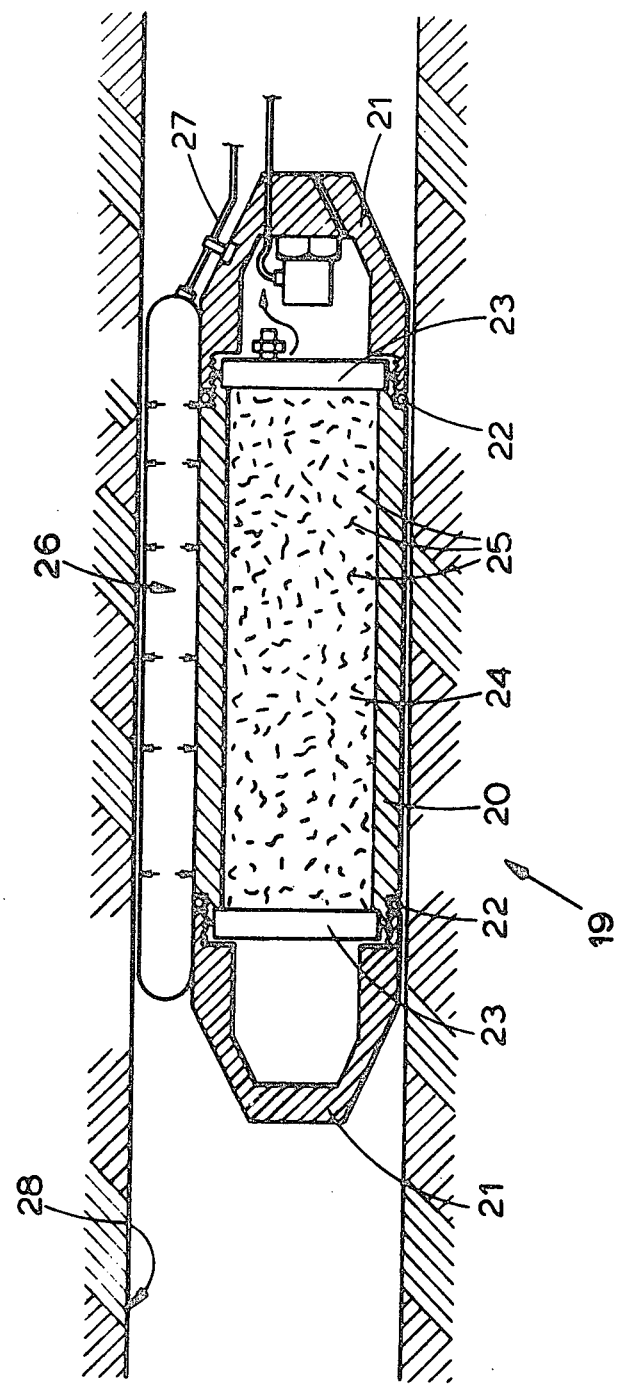
FIG. 5 shows in greater detail an embodiment of vibrator believed novel per se suitable for use in the FIG. 4 arrangement.

FIG. 4 depicts the use of a down-hole vibrator 19 which is shown in more detail in FIG. 5. The vibrator 19 is provided with a thick-walled cylindrical electrically-insulated shell 20 and thick-walled end caps 21, all of which may be formed from anodised aluminum. The end caps are tightly and sealingly screwed onto the ends of the cylindrical shell, intermediate sealing rings 22 being provided to ensure a tight seal. Within the shell are fixedly located two end electrodes, in the form of large plates 23; and the cylindrical space between the electrodes 23 and the cylindrical shell 20 is entirely filled with a gel-like silicon material 24 in which is suspended many fine metallic particles 25,25 which are magnetically sensitive. One of the end caps 21 is provided with apertures 26 through which sealingly extend an electrical cable and an armoured cable for reasons to be explained. The electrical cable is coupled with the electrodes 23 for the supply thereto of a variable frequency electrical current. Such current causes the metallic particles 25 to alternate their attraction and repulsion between the two electrodes, which, in turn, imparts an enertial energy to the gel-like matrix 24. To one side of the cylindrical shell 20 is attached an inflatable capsule 26 shown in FIG. 5 expanded into place within the borehole after the vibrator 19 has been lowered theredown by means of its armoured cable. For this purpose the capsule 26 has fitted thereto a pneumatic line 27 which will also, of course, pass to the surface to a central control station. When the capsule 26 is expanded into position as shown in FIG. 5, and the gel-like matrix is set into vibration as described, the matrix will in turn impart inertial forces to the cylindrical shell and thus will impart an oscillating force longitudinally within the boreholoe 28.

As shown in FIG. 4 schematically, a region of soil or rock generally indicated at 29 participates in the longitudinal borehole vibration with a resonance phenomenon. This produces shear waves which are polarised in the direction of the borehole and which are transmitted through the soil or rock medium as indicated at 30. An adjacent borehole 31 is also shown in FIG. 4 with a suitable sensor capsule 32 mounted thereon. Borehole 31 may be only one of a series of boreholes located in the neighbourhood of borehole 28 to provide a thorough exploration of the rock and sub-soil below ground surface 10.

As before, any anomaly existing in the region of the boreholes will be intercepted by the shear waves as will become apparent from the spectrum of vibration response at varying transmitted vibration frequencies obtained from the sensors such as 32. Once an anomaly has been detected, a technique of triangulation can readily map it in three dimensions. I find that this refinement of my method provides more sophisticated results than I have been able to obtain with the methods described above, since it is possible to locate both the vibration source and the sensors such as 32 closer to suspected anomalies. I find that I can readily differentiate between different types of anomalies such as a void or aquifer and a mere interface between strata as indicated at 33.

3. Investigation beneath existing structures and buildings

The methods described above can be used to detect poor or deteriorating substrata beneath existing buildings. The basement floor is excited by a vibrator throughout a wide frequency range and a response spectrum of the floor is obtained. From a knowledge of the geometry of the building and other design parameters such as material properties, a theoretical response spectrum for the floor can be constructed. A comparison of the actual and theoretical spectra will indicate the presence of an unsound support for the foundation e.g. a void beneath the floor. The frequency response differences are significantly large between a floor properly supported on an elastic foundation and a foundation containing voids.

I have performed a test in accordance with this invention in the basement of a building. The frequency response spectra indicated that the floor had insufficient support and that a void must exist beneath the floor. Subsequent excavation revealed that a cavity did exist due to the high pressure washing action of a burst water main which then became confluent with an existing underground stream, effectively creating a solution cavity in a short time period.

4. Continuous or Periodic Monitoring of Structures

Specific examples of continuous or periodic monitoring are given below, but I believe it would first be helpful to give a general background discussion of my method as applied to such continuous or periodic monitoring of structures.

My continuous or periodic monitoring method is basically different from other methods of test in that the entire structure as a system is monitored, instead of inferring structural behaviour from observations and measurements taken from single components. A single component strain gauge bonded to a particular point on a component of the structure will give the state of strain at that point. If a load is applied near that point, the change in strain will be observed. If the load is applied to some remote part of the structure, changes in strain may not occur or may occur in such a manner as to be incomprehensible. The reason for this is that the strain gauge location, although known in relation to the structure, is not known in relation to the all-important locked-in stresses and stress concentrations in the structure. A multiplicity of strain gauges over all the surfaces of the structure would overcome this problem, but instrumentation costs would then exceed that of the structure. The strain gauge method, therefore, is referred to as a static (or non-dynamic) single point test. A similar static method of non-destructive testing (or NDT) is the ultrasonic technique where a detector and source are placed, for example, on opposite sides of a concrete beam. The system measures the phase velocity of the ultrasonic compression waves travelling through the concrete and again by inference and comparison to many previous tests on similar materials, a judgment can be made as to the integrity of the concrete in the beam at that point. Specifically, it does not test the beam for its intended function, i.e. as a load carrying system; therefore one must always infer results.

Figure 6A:
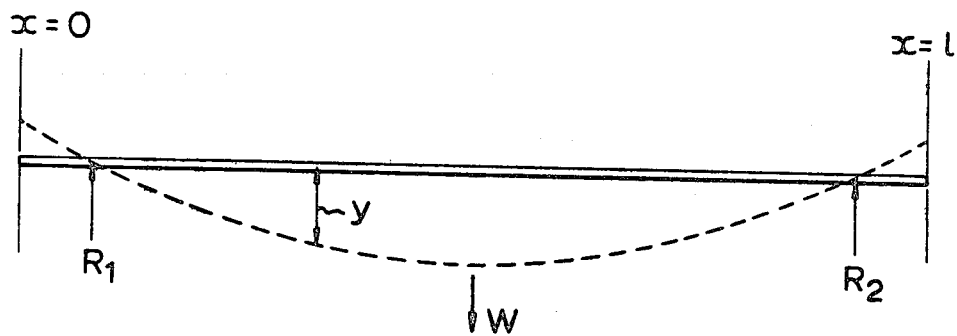
FIGS. 6A and 6N illustrate respectively the static bending of a simply supported beam and the dynamic bending modes of the same beam for the purpose of illustrating the invention.
Figure 6B:
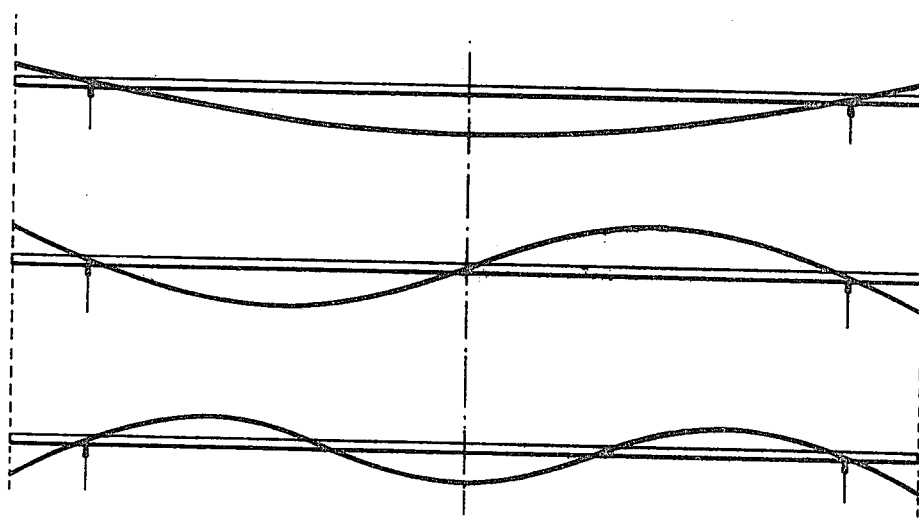

My methods provide an elegant approach, avoiding these difficulties by exciting and monitoring the dynamic qualities of a structure. Again, consider the concrete beam. If a static load deflection test is performed on the beam, all parts of the beam are stressed as would be done in service. This same beam, when vibrated over its 'structural' range of frequencies, will exhibit response modes directly proportional to the bending stiffness or the EI values. The EI values control both the static deflection and the frequencies at which the different dynamic bending modes occur. This is illustrated by FIGS. 6A and 6B. FIG. 6A illustrates the static bending of a simply supported beam, the beam being supported at $R_1$ and $R_2$ and being subject to a displacement y at a position x from the left hand end of the beam in FIG. 6A upon the Application of a load W. The general differential equation of the elastic curve is $$EI\, d^2y/dx^2 = M$$

where EI is the bending stiffness and M is the bending moment in terms of x. FIG. 6B illustrates the dynamic bending of the same simply supported beam and illustrates the first, second and third modes of bending. The natural bending frequency of the beam, $\omega_n$ for the $n^{th}$ mode is given by the expression $$\omega_n = A_n \sqrt{\frac{EI}{\mu l^4}}$$

where $A_n$ is a numerical constant which is different for each mode of bending, EI is the bending stiffness, $\mu$ is the mass per unit length and l is the length of the beam. For the first three modes $A_n$ takes the following values:

$$A_1 = \pi^2, A_2 = 4\pi^2, \text{ and } A_3 = 9\pi^2.$$

If a fault occurs in the beam, by inducing a crack for example, the frequencies of response change radically and the crack location is readily observed. Hence it is possible by the application of my methods and apparatus described previously herein to monitor the day-to-day performance of the beam by sweeping through the frequency range and observing the response spectrum of frequencies on each day and noting any variation in the frequencies at which maxima occur. If this simple beam is now considered to be part of a structure, no matter how complex, the beam will adopt a different frequency spectrum, this time depending on the end fixities, the distributed loading along the beam and of course, on the EI values. Providing all these parameters remain constant, the frequency spectrum remains constant, indicating that the structural integrity of the beam *and of the remainder of the structure* has not changed.

The mechanical impedance presented to the vibrator by any part of the structure is recorded as a function of frequency; any slight change in the complex stress pattern in the structure, such as a gradual embrittlement (fatigue candidate) of one member, is manifested as a change in mechanical impedance (and hence effectively amplitude) and a frequency shift. Of course, a multiplicity of measurements must be taken and a number of different parts of the structure must be excited. On a very complex structure, I would use as many as six vibrator points and 100 measurement points. The effect of someone placing a hand on say an aerospace structure during vibration testing can readily be observed, illustrating the sensitivity of the method. It will be appreciated that, for example, the effects of storms on an offshore structure could be easily discerned. This and other examples of use of my periodic monitoring system will now be described.

4.1 Offshore Structures

Figure 7:
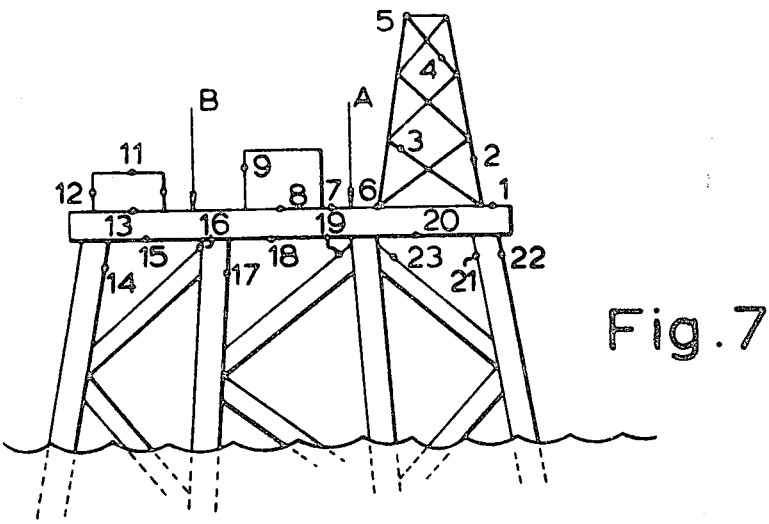
FIG. 7 illustrates schematically an offshore structure and a plurality of suitable positions for mounting vibrators and detectors for performing a continuous monitoring method in accordance with this invention.

My methods lend themselves for ready application directly to various parts of the super-structure of an offshore structure. Either an electrohydraulic or electromagnetic vibrator can be attached to a main member and arranged to respond either differentially between two parts, or seismically using its own reaction mass. Choice of the type of vibrator depends upon the frequency range requirements. The hydraulic unit exerts large forces over a range from 0 Hz to about 180 Hz. The electromagnetic unit operates from approximately 5 Hz to 2000 Hz with moderate force. The size and stiffness of the members of the offshore structure would dictate the frequency range which could be sensibly covered. FIG. 7 shows suitable locations for vibrators and detectors for setting the super-structure into its various resonances and detecting the same. Points A and B represent two arbitrarily placed vibration points on the deck of the structure; the points numbered 1–23 represent transducer points at which accelerometers or other devices are placed. These sense the amplitudes and frequencies of the responding members, which are then recorded by tape, transferred to tape punch and digitally stored. The complete signal conditioning equipment and recording system would be housed in a specially designed building on the deck of the offshore structure.

Figure 8:
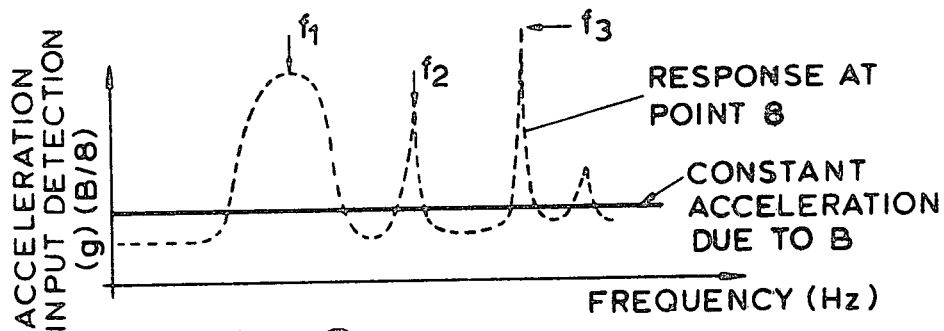
FIG. 8 schematically illustrates the frequency response curve at one of the detectors of FIG. 7.
Figure 9:
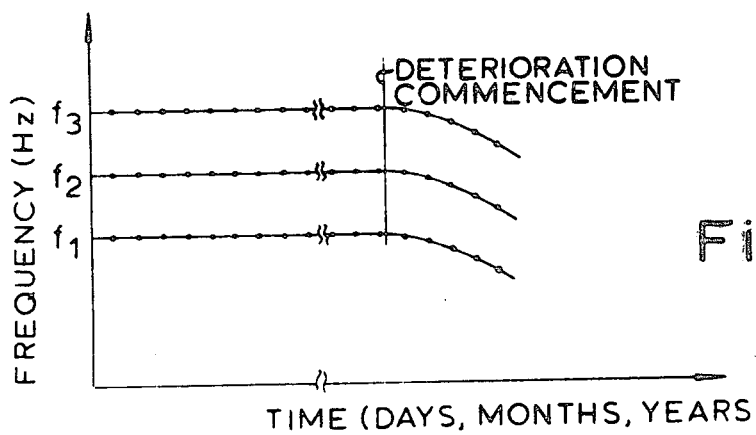
FIG. 9 schematically illustrates how the frequencies at which maxima occur in the spectrum of FIG. 8 may vary over time and with events.

FIG. 8 indicates the type of analog plot derived from vibrating at Point B with the response of Point 8 superimposed (B/8). The first few structural frequencies, $f_1 \ldots f_n$ are the important ones, and as long as the structure has not sustained damage which would affect the impedance path between Points B/8, the analog plot shown in FIG. 8 would be duplicated in periodic tests. FIG. 9 shows an extended time plot of $f_1 \ldots f_3$ with a change in the responses such as might occur after a storm.

When a response change is detected and appears to be not only irreversible but continues to deteriorate, the important points to consider are:
 (i) diagnostic tests to determine the exact location or area of deterioration;
 (ii) special tests to monitor the rate of change of the deterioration (rate of failure);
 (iii) accompanying data interpretation and theoretical analyses to decide the nature of impending failure, corrosion fatigue, embrittlement etc.; and
 (iv) engineering judgment and recommendations on remedial action.

Considering the size and mass of an offshore structure, and the fact that practical embodiments of my method induce low level oscillating stresses of $\pm 5$ to $\pm 15$ psi in the structure, the responses will be damped out and attenuated after a given travel path, mostly depending on the inherent material and structure damping properties. FIG. 7 reflects this, where for the deck vibration positions A and B, the response points are shown in the vicinity of the deck and super-structure.

For testing and measurements of the support structure above the waterline, other vibration points on the support structure may be required, in which case I prefer that permanently installed vibrator (s) be used together with permanent response points for the transducers. Waterproofing and protection for the testing and measurement systems are desirable.

Below the waterline, methods in accordance with this invention can also find application, but for an entirely satisfactory adaption further work is necessary in the development of small and inexpensive vibrators which can be attached to or cast in place in each critical member making up the structure.

Development work on small and inexpensive vibrators adapted for continuous immersion in sea water is continuing. Meanwhile, I have devised a variety of different forms of gauges which are inherently adapted for operation under water and which are suitable for incorporation into the construction of an offshore structure.

Figure 11:
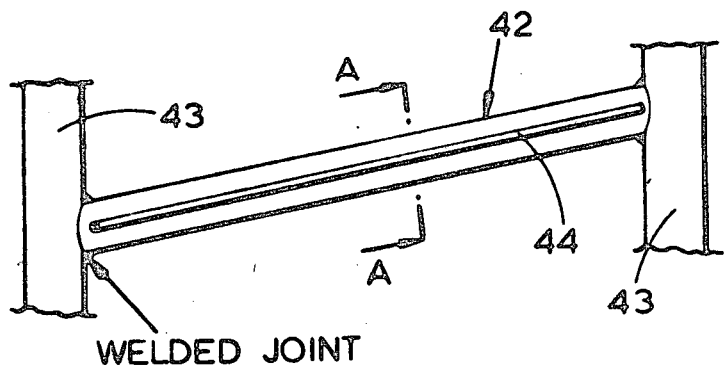
FIG. 11 shows a perspective view of one small portion of the structure of FIG. 10.
Figure 12:
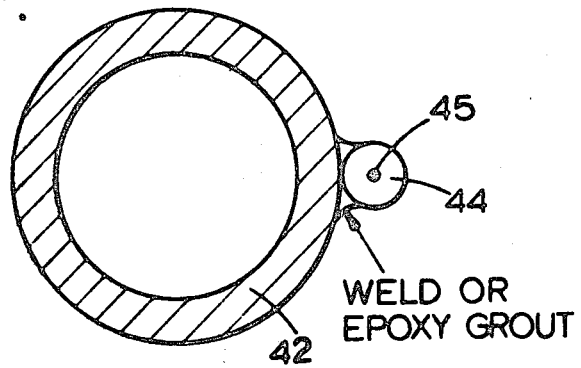
FIG. 12 is an enlarged sectional view taken along the line A—A in FIG. 11.

FIG. 10 schematically illustrates such an offshore structure 41 standing on the sea bed. The majority of its structural members will be constructed of steel. I envisage the provision of elongate gauges on each such structural member, of which a typical member is indicated at 42. The member 42 is shown in greater detail in FIG. 11 which is also schematic. As will be clear, its ends are welded to vertical structural members 43 and it is provided along its length with a closed tube, formed of plastics or steel for example. This tube 44 has at least its ends solid with the structural member 42 and preferably it is joined to the structural member along its entire length by being welded (if of steel), or by the use of an epoxy grout (if the tube 44 is of plastics).

Figure 13:
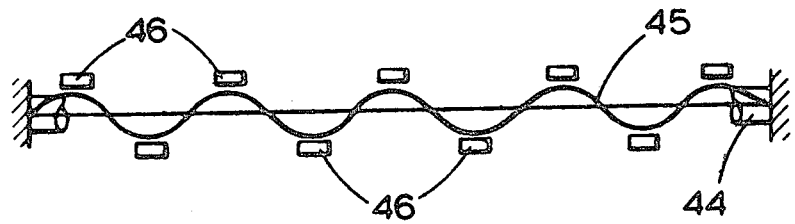
FIG. 13 is a schematic longitudinal view of the gauge illustrated in FIGS. 11 and 12 and illustrating its mode of operation.

A wire 45 is stretched between the ends of the tube 4 and in effect constitutes a stretched wire gauge. Stretched wire gauges are commercially available and are operated by an electro-magnet which plucks the wire at its centre point to set it into its fundamental mode of vibration. The same electro-magnet is effective to detect the vibrations and by suitable electronics to give a determination of the frequency of the vibrating wire. Such commercial gauges are generally between 3 and 12 inches in length. I envisage extending such gauges to the full length of the structural members of the offshore structure. With a gauge of such length the fundamental mode of vibration would be impracticable, partly because the frequency of vibration would be too low in my view for the necessary resolution and accuracy, and more particularly because the diameter of the tube would be insufficient to accommodate the amplitude of vibration likely to occur. Instead as schematically illustrated in FIG. 13, I propose to set the wire into one of its higher harmonic frequencies of vibration. I have found that this can readily be done by providing a plurality of electromagnets along the length of the wire as indicated at 46 in FIG. 13 which also shows the configuration of the wire immediately upon being set into vibration. As is clear, each electro-magnet determines the position of an antinode in the vibration of the wire. In practice the electromagnets 46 associated with each such gauge would be excited simultaneously from a remote control location for example in a building 47 provided on the super-structure and well above the waterline. The electro-magnets 46 will also be connected in a detection circuit adapted to record the characteristic frequency of the selected harmonic in the particular gauge. Since the ends of the gauge are solid with the structural member concerned, the characteristic frequency is directly related to the length of the structural member between the ends of the gauge. The length of the member will of course vary with its state of strain so that variations in the characteristic frequency of the gauge may be interpreted as variations in the state of strain of its associated member.

FIG. 16 schematically illustrates what might happen over time. It shows the characteristic frequencies $f_a$, $f_b$, and $f_c$ for three different gauges associated with different structural members. As might be expected if the structure is sound there is little if any variation in the frequencies to begin with. Then it seems that a catastrophic event has occured in the life of the structure 41. Perhaps this was a force 12 storm, or collision of a ship with the structure. The effect on the structure is apparent from the variation in the frequencies of the gauges. It seems that frequency $f_c$ has dropped substantially indicating a substantial dimensional or strain alteration in its associated member but that this appears to be stabilizing. Frequency $f_a$ has varied more slowly, but it is too early to say whether it is stabilizing at a new frequency. Frequency $f_b$ seems to have altered little indicating that the strain state of its associated member is substantially unaltered after the event.

Clearly when such a response change is detected and appears to be irreversible, the important points to consider will again be those set out above under (i), (ii), (iii) and (iv).

Figure 14:
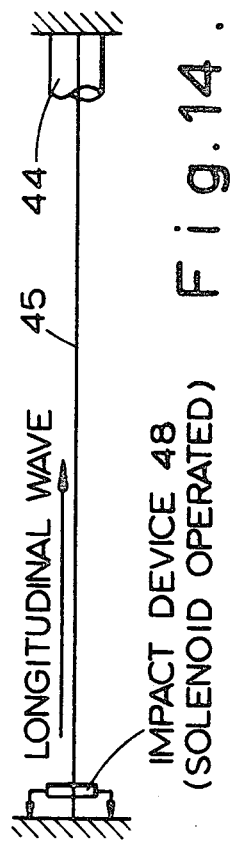
FIG. 14 is a schematic view generally similar to FIG. 13 but illustrating the mode of operation of a modified form of gauge.

Instead of setting the wire 45 into transverse vibrations, it may be set into a longitudinal mode of vibration as indicated schematically in FIG. 14. In this instance an impact device 48, which may be solenoid operated (again from the remote location 47), is shown impacting the left hand support for the longitudinal wire further to the left. Alternatively the impact device could operate on this same support but in the opposite direction. The system may be readily adapted to detect the double transit time of the longitudinal wave propagating the length of the wire. The tension in the wire is proportional to $c^2 \rho$, where c equals the velocity of propagation and $\rho$ equals the mass per unit length of the wire. The right order of sensitivity may be achieved by selecting the appropriate tension for the wire and, even if the tube is flooded, the results will not be affected.

Figure 15:
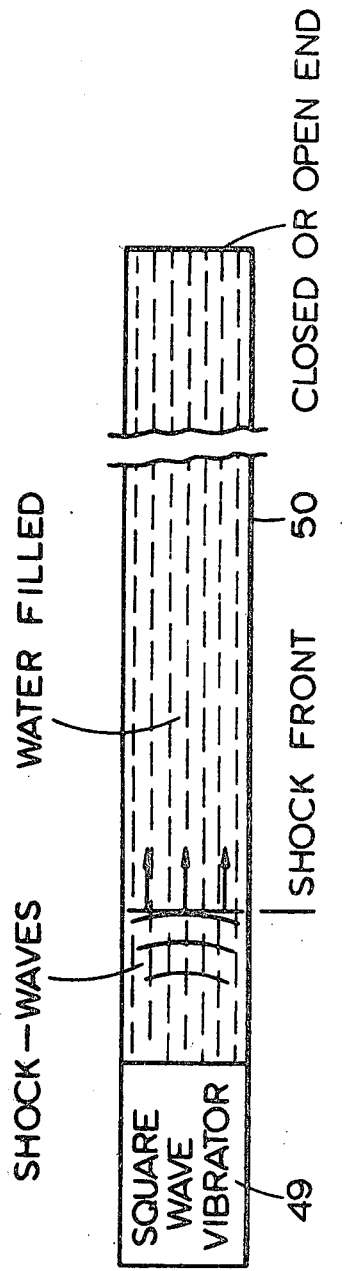
FIG. 15 illustrates in a cross-sectional view with part cut away a yet further embodiment of gauge.

A yet further alternative form of gauge is schematically illustrated in FIG. 15. A square wave vibrator 49 mounted at one end of a tube 50, whose other end may be open or closed, and which tube again has its ends solid with its structural member, provides a shock wave 51 which propagates down the tube, which is water filled even when it has its other end closed. Again, the double transit time or frequency are measured by suitable detectors which may readily be incorporated in the gauge. The characteristic water hammer frequency is inversely proportional to the length of the tube, so that any variation is again indicative of a change in the dimension, and hence strain state, of the associated structural member.

Heretofore the only practicable way of continuously monitoring offshore structures both above and below the waterline has been by visual inspection and while this method may be expected to locate any gross defects, it cannot with any degree of certainty detect the more subtle changes which can eventually lead to catastrophic failure unless treated. Moreover, the requirement for visual inspection both above and below the waterline means that trained personnel are continuously exposed to conditions of extreme personal danger in the North Sea. The adoption of the teachings of this invention will, I believe, make much of this routine inspection work unnecessary so that skilled personnel need only be exposed to conditions of danger when an irreversible change in the structural integrity has been inferred from changes in the frequencies at which maxima occur in the vibration response spectra or in the gauge characteristic frequencies, and then only to perform remedial work.

4.2 Concrete Deterioration

In recent months considerable concern has been shown in the United Kingdom over the irreversible changes which can occur in reinforced concrete structures, and particularly those with high alumina content, often with catastrophic results. Where high alumina content reinforced concrete beams have been used in the construction of public buildings such as schools, local authorities are faced with the choice between two extremely expensive courses of action: either the buildings are demolished and reconstructed afresh, or a programme of repeated evaluation by non-destructive testing methods must be introduced. Even if the latter course of action is chosen, the short-comings of conventional non-destructive testing methods, namely that they only detect the structural integrity of a component at one location, still mean that one cannot tell for certain on the basis of such prior methods whether any particular structure or component is safe as a whole. Some degree of security is provided if one of the conventional non-destructive testing techniques is applied to each and every high alumina content concrete beam at close intervals along its length at repeated intervals, but it will be appreciated at once that this represents an extremely costly investment in terms of instrumentation and personnel.

A continuous monitoring method in accordance with this present invention can readily be applied to such structures. A single vibrator and a relatively small number of detectors may suffice for each beam. The recording of the resultant data is readily automated since the only significant information required is whether the frequencies at which the maxima in the frequency spectra occur deteriorate irreversibly over time. The system can be set up to work automatically to give a readily apparent warning indication should such a condition obtain. The particular beam in question will then be known to be suspect allowing either further evaluation or its immediate replacement.

4.3 Existing Bridges

The integrity of railway and road bridge structures can readily be monitored over a period of time by the use of methods and apparatus in accordance with my invention. Conveniently I use an oscillating low level variable frequency stress wave which is applied to the structure and the vibration responses at different locations thereon are monitored. The frequency spectra will indicate whether the structure is sound and whether any part or component is either highly stressed or has exceeded its yield strength and entered the plastic state. Periodic repetition of the testing will provide a stress history of the structure. If a change in the boundary conditions has taken place, such as a change occurring in the stress loading of the bridge structure, then the vibration response will also change. I have found that the frequency spectrum is particularly liable to change.

4.4 Existing tunnels

A particular problem in tunnels, especially ancient tunnels where masonary or brick lining has been used, is a tendency for voids to occur behind the lining. This gives rise to weak regions of the tunnel. Since so many of the railway tunnels currently in existence throughout the world were built in the last century, many railway authorities are now currently expressing concern about the potential dangerous state of the linings to their railway tunnels. Abnormally low resonances in the frequency spectra of vibration response in the performance of a method in accordance with this invention result if the vibrator is placed near a cavity or delamination of the lining from the native rock material.

4.5 Railway Track Systems

The advent of very high speed (and therefore high frequency) vehicles has heightened the dangers inherent in railway track systems. A faulty system will necessarily increase the probability of derailment or worse. Methods and apparatus in accordance with my invention are particularly suitable for testing the soundness of a particular length of track system (ie. the track/sleeper/ballast system as a whole) and of monitoring a length of track system periodically to detect the onset of any fault. A portion of track may be set into resonance by the application of vibrations in the performance of a method in accordance with my invention and the total response of the system may be compared with the response from a known sound portion of the same system. Faults will show up in differences in the resonant frequency in the response spectra. Variations in the frequencies at which maxima occur over time will indicate deterioration in the system as a whole, and moreover, the way in which the frequencies alter, and which resonances are most effected can indicate which element of the system (ie. track or sleeper or ballast) is giving rise to the fault.

Practicing engineers will readily appreciate other Applications for the continuous monitoring techniques of this invention.

Many alternative methods of non-destructive testing of engineering structures and of exploring ahead of a tunnel face and performing surface site investigations have been and are in use today. It has been found however, as previously mentioned, that all of them suffer from peculiar advantages and disadvantages and require almost ideal site conditions in order to provide reliable data. The various examples of frequency analysis methods described herein offer the engineering geologist, geophysicist and site investigation engineer a very powerful method of obtaining a three-dimensional picture of the solid media and of pinpointing cavities, fissures, aquifers and the like, almost regardless of site conditions.

I believe that the teachings of this invention will find their broadest application in such engineering and geophysical investigations and in site investigation work generally and also in the continuous or periodic monitoring of engineering structures, but the methods of this invention are not limited to these disciplines. The testing of the soundness of structures of various kinds is of interest in other apparently entirely divorced fields. Thus, for example, methods in accordance with this invention can be employed in dentistry to investigate the soundness of teeth, obviating the need for X-rays, or in medical practice in testing whether broken bones have been adequately repaired. Further examples include: testing the structural integrity of cast-in-place concrete piles and other buried structures, pinpointing the weak areas of existing structures and determining the strength of concrete as it cures without the necessity of casting the conventional control specimens. Further work is being pursued to adapt the broad method disclosed herein for use in specialised fields, and in particular to design specialised forms of apparatus for use herein.

I claim:

1. A method of locating and determining the extent of any near surface structural void, shear plane, fault, inclusion zone, weakness or anomaly within a structure said method comprising the steps of:

transmitting a vibration wave of momentary fixed frequency over a large frequency range into and through said structure from a specific vibration input location and thereby producing vibration responses at various points in said structure;

detecting the vibration responses at a plurality of detection locations spaced from said vibration input location over at least a substantial two dimensional structure area;

determining the first frequency vibration responses at said detection locations; and plot connecting the detection location points of maxima or resonance frequency to indicate the presence and to define by contour outline the location, size and nature of a void, shear plane, fault, inclusion, zone of weakness, or anomaly within said structure.

2. A method according to claim 1 for investigating the soundness of a structure, in which said structure consists of soil and rock immediately below the ground surface, wherein said vibration input location and each of said detection locations consist of a respective position on the ground surface, a vibrator being coupled to the ground surface at said vibration input location in a manner to transmit compression waves through the ground; and respective vibration detectors being located on the ground surface at said detection locations to detect reflected vibrations produced by a sub-surface anomaly interrupting passage of the transmitted vibration.

3. A method according to claim 2, for investigating the soundness of soil and rock below the ground surface, wherein a sub-surface anomaly, the presence of which is detected by production of a frequency response spectrum characteristic of such anomaly, has its position and size determined by having the step of detecting the vibration responses at a plurality of detection locations comprising:
   driving one or more bore holes into the ground in the region of detection of such anomaly;
   placing triaxial accelerometers at locations within said one or more bore holes;
   triangulating the points of maxima or resonance frequency vibration responses so detected.

4. A method for investigating the soundness of soil and rock below ground surface according to claim 3, in which the frequency of the transmitted vibration is varied within the range of from about 2 Hertz to about 600 Hertz.

5. A method according to claim 1 for investigating the soundness of a structure, in which the structure consists of ground ahead of a forward face of a tunnel being driven below ground surface; and wherein said vibration input location consists of the center of said forward face, a vibrator being coupled thereto to transmit compression waves into said ground ahead of said forward face; and wherein said detection locations consist of positions upon said forward face spaced from said vibration input location, respective detectors being placed thereat to detect the vibration response of said ground ahead of said forward face consisting of said transmitted wave, reflected waves produced by interception of said transmitted wave with anomalies within said ground, and mutual interference between said transmitted and reflected waves.

6. A method according to claim 4 for investigating the soundness of the ground ahead of a forward face of a tunnel being driven below ground surface, in which said tunnel is being driven through rock, and in which the frequency of said transmitted wave is varied in the range from about 10 Hertz to about 2000 Hertz.

7. A method according to claim 5 for investigating the soundness of ground ahead of a forward face of a tunnel being driven below ground surface, in which the tunnel is being driven through soft ground, and in which the frequency of said transmitted wave is varied in the range from about 2 Hertz to about 600 Hertz.

8. A method according to claim 1 for investigating the soundness of a structure, in which the structure consists of sub-surface ground, and wherein:
   a plurality of bore holes are driven into the ground, said vibration input location and said plurality of detection locations being located within said bore holes; a vibrator unit is located within one said bore hole, the vibrator unit having an expansion chamber which on expansion couples the vibrator unit at said vibration location within the bore hole to the sides of the bore hole, and the vibrator unit having a vibrator adapted to vibrate in a direction parallel to the axis of the bore hole, thereby to generate polarized shear waves radiating through the sub-surface ground from said vibration input location respective vibration response sensors being placed at said detection locations in one or more other bore holes of said plurality to detect the vibration response at said detection locations as the frequency of the transmitted shear wave is varied over said range.

9. A method according to claim 1 for investigating the soundness of a structure, in which the structure consists of sub-strata beneath an existing building, and wherein said vibration input location consists of a position on a basement floor of said existing building, a vibrator being coupled thereto in a manner to produce said vibration wave and to transmit that vibration wave into the sub-strata; and wherein said detection locations consist of locations remote from said vibration input location and selected from the group consisting of locations on the basement floor, locations on walls of the basement and locations on ground surface adjacent said building, respective vibration response detectors being placed at said detection locations and being arraned to detect the vibration response at said detection locations as the frequency of the transmitted wave from said vibrator is varied.

10. for use in investigating the soundness of structues, means for producing and transmitting a vibration through said structure comprising:
   a vibrator adapted to be set into vibration with a frequency selected from within a range of frequencies;
   a ground plate adapted for coupling the vibrator to ground surface, to soil and rock surfaces on a forward face of a tunnel, and the like, the ground plate having a generally saucer-shape with a substantial rim, the concave side of said saucer-shaped ground plate being adapted to bear agaitst the ground and being divided into a plurality of sections by radial webs;
   means for connection of the spaces defined between said radial webs to a source of vacuum for at least partial exhaustion of space defined between the saucer-shaped ground plate and the ground, tunnel forward face, and the like.

11. A vibrator unit for use in investigating the soundness of structures, said vibrator unit being adapted to be lowered to a location within a bore hole within said structure, having an expansion chamber arranged such that upon extension thereof the vibrator unit is coupled at a selected position within the bore hole to the sides thereof, a vibrator within said unit adapted to vibrate in a direction parallel to the axis of the bore hole and to thereby generate polarized shear waves radiating through a sub-surface ground from the region of the vibrator unit, said vibrator unit comprising:
   a thick-walled cylindrical electrically-insulated shell provided with similar thick-walled end caps tightly and sealingly fitted to the ends of the cylindrical shell;

a pair of end electrodes respectively fixedly located at opposite ends of said shell and extending thereacross;

entirely filling the cylindrical space defined between said electrodes and said cylindrical shell, a gel-like silicon material in which is suspended a plurality of fine magnetically sensitive metallic particles;

means adapted to couple said electrodes to a source of electrical power, passing in fluid tight fashion through one said end cap, and being adapted to provide an electrical current of selected frequency to said electrodes to cause oscillation of said metallic particles between said electrodes to impact an oscillating inertial energy to the gel-like silicon material matrix;

and wherein said expansion chamber comprises an inflatable capsule attached to one side of the exterior of said cylindrical shell, said capsule being provided with means for connection to a pneumatic source for expansion of said capsule within a bore hole to positively locate said vibrator unit at a predetermined location within said bore hole.

12. A method of monitoring the soundness, structural integrity and performance of a structure over a period of time, the method consisting of:

producing a vibration wave over a large frequency range;

transmitting said vibration wave through said structure from a vibration location to produce vibration responses therein;

sampling the vibration response at a plurality of detection locations on said structure spaced from said vibration location;

producing a record of the frequencies at which maxima occur in the frequency spectra; and performing all the aforesaid steps at predetermined intervals of time to determine any variation in frequencies at which maxima occur in the frequency spectra of vibration response at the same plurality of detection locations during the passage of time such that the variation in frequency constitutes the first sign of incipient failure of said structure and wherein the general location of said incipient failure may be determined relative to the detection location by reference to the individual records of said given detection locations.

13. A method according to claim 12 for monitoring the soundness, structural integrity and performance of a structure over a period of time, in which the structure consists of an off-shore structure selected from the group consisting of oil and gas off-shore exploration platforms and oil and gas off-shore production platforms, a vibrator being coupled to said off-shore structure at said vibration location in a manner to transmit compression waves thereinto and therethrough, and respective detectors being coupled to the off-shore structure at said detection locations in a manner to detect the vibration response of said structure at said detection locations; and wherein control means are provided on said structure automatically producing an effective record of the frequencies at which maxima occur in the frequency spectra of vibration response at said detection locations and of any variation in the frequencies of said maxima during the passage of time indicates the first signs of incipient failure of a portion of said off-shore structure.

14. A method according to claim 12 for monitoring the soundness, structural integrity and performance of a structure over a period of time, in which the structure consists of one or more concrete components liable to deteriorate, a vibrator being coupled to said one or more concrete components at said vibration location and respective detectors being located at said detection locations, being positions spaced along the length of said one or more concrete components, to effectively produce a record of the frequencies at which maxima occur in the frequency spectra of vibration response at said detection locations as said vibrator is swept through said range of frequency, and to produce a record of any variation in the frequencies at which maxima occur in the frequency spectra of vibration response at said same detection locations during the passage of time.

15. A method according to claim 12 for monitoring the soundness, structural integrity and performance of a structure over a a period of time, in which the structure consists of an existing bridge, a vibrator being coupled at said vibration location to said bridge in a manner to produce and transmit said vibration wave, and respective vibration response detectors being placed at said detection locations, being locations on said bridge spaced from said vibration location, effectively to produce a record of the frequencies at which maxima occur in the frequency spectra of vibration response at said detection locations and to provide a record of any variation in the frequencies at which maxima occur in the frequency spectra of vibration response at said same detection locations during the passage of time.

16. A method according to claim 12 for monitoring the soundness, structural integrity and performance of a structure over a period of time, in which the structure consists of an existing tunnel a vibrator being coupled at said vibration location to said tunnel in a manner to produce and transmit said vibration wave, and respective vibration response detectors being placed at said detection locations, being locations on said tunnel spaced from said vibration location, effectively to produce a record of the frequencies at which maxima occur in the frequency spectra of vibration response at said detection locations and to provide a record of any variation in the frequencies at which maxima occur in the frequency spectra of vibration response at said same detection locations during the passage of time.

17. A method according to claim 12 for monitoring the soundness, structural integrity and performance of a structure over a period of time, in which the structure consists of a length of railway track system, comprising the track proper, sleepers, and ballast; a vibrator being coupled at said vibration location to a length of said system in a manner to produce and transmit said vibration wave through said length of system; and respective vibration response detectors being placed at and coupled to said system at said detection locations, being locations spaced therealong, to effectively produce a record of the frequencies at which maxima occur in the frequency spectra of vibration response at said detection locations and to provide a record of any vibrations in the frequencies at which said maxima occur at said same detection locations during the passage of time.

18. An off-shore structure provided with apparatus for continued monitoring of soundness, structural integrity and performance thereof over a period of time, which apparatus comprises:

at least one vibrator mounted on and coupled to said structure at a vibration location above the waterline and being adapted to produce a vibration with a frequency selected within a frequency range and to transmit said vibration as a wave through said structure from said vibration location;

a plurality of vibration response detectors coupled to said structure at detection locations thereon spaced from said vibration location above the water-line;

means coupled to said plurality of detectors for effectively producing a record of the frequencies at which maxima occur in the frequency spectra of vibration response over said range at said detection locations;

control means for operating said apparatus at predetermined intervals and for producing a record of any variation in the frequencies at which maxima occur in the frequency spectra of vibration response at the same detection locations during the passage of time;

and wherein said apparatus further comprises elongate gauges extending longitudinally of selected critical members of said structure below the water-line, each said gauge having its ends solid with its respective member and including means for causing a vibration to be set up between the ends of the gauge, and means for detecting the characteristic frequency of said vibration.

19. An off-shore structure according to claim 18 wherein said control means is further adapted to periodically operate said gauges and is provided with means for recording any variation of the detected characteristic frequencies of said gauges indicative of changes in the longitudinal dimensions of said members and thus of their strain states.

20. An off-shore structure provided with means for monitoring its structural integrity and performance, which means comprise:

elongate gauges extending longitudinally of selected critical members of the said structure below the water-line, each said gauge having its ends solid with its respected member and including means for causing a vibration to be set up between the ends of the gauge, and means for detecting the characteristic frequency of said vibration;

means for periodically operating said gauges from a location above the water-line; and means for recording any variation of the detected characteristic frequencies of said gauges indicative of changes in the longitudinal dimensions of said members and thus of their strain states.

21. In an off-shore structure according to claim 20 provided with means for monitoring its structural integrity and performance, an elongate gauge comprising:

a wire stretched between opposite ends of means defining a tubular cavity extending along at least the greater part of one said critical member, with at least the ends of said means solid with the respective member;

a plurality of equi-spaced electromagnetic means along the length of the wire and adapted when operated in unison to determine positions for antinodes in vibration of the wire in an harmonic mode; and an electrical control and detection circuit coupled to all said electromagnetic means and adapted to excite said electromagnetic means simultaneously to set said wire into its said harmonic and further adapted to record the resultant characteristic frequency of the said harmonic.

22. In an off-shore structure according to claim 20 provided with means for monitoring its structural integrity and performance, an elongate gauge which comprises:

a stretched wire located within means defining a tubular cavity extending along at least the greater part of one said critical member with at least the ends of said means solid with the respective member;

an impact device adapted to impact means supporting said wire at one end thereof, thereby to set said wire into a longitudinal mode of vibration; and means for detecting the double transit time of a longitudinal wave propagated along the length of said wire.

23. In an off-shore structure according to claim 20 provided with means for monitoring its structural integrity and performance, an elongate gauge which comprises:

an elongate tube extending along at least the greater part of the length of one said critical member;

at one end of said tube and coupled thereto a square-wave vibrator adapted to provide a shock wave to propagate along the said tube;

the other end of the tube being open to the sea; and detector means coupled to said tube and effective to record the characteristic water-hammer frequency of said gauge.

24. In an off-shore structure according to claim 20 provided with means for monitoring its structural integrity and performance, an elongate gauge which comprises:

an elongate tube extending along at least the greater part of the length of one said critical member;

at one end of said tube and coupled thereto a square-wave vibrator adapted to provide shock wave to propagate along the said tube;

the other end of the tube being closed; and detector means coupled to said tube and effective to record the characteristic water-hammer frequency of said gauge.

* * * * *